United States Patent
Nourbakhsh

(10) Patent No.: US 6,400,443 B1
(45) Date of Patent: Jun. 4, 2002

(54) EXPOSURE SLIT WITH LIGHT REFLECTION HOOD

(75) Inventor: Farhad Nourbakhsh, Apple Valley, MN (US)

(73) Assignee: Electronics For Imaging, Inc., Foster City, CA (US)

( * ) Notice: Subject to any disclaimer, the term of this patent is extended or adjusted under 35 U.S.C. 154(b) by 0 days.

(21) Appl. No.: 09/356,210

(22) Filed: Jul. 16, 1999

(51) Int. Cl.⁷ .................. G03B 27/54; G03B 27/72; G03B 9/36; G02B 26/02
(52) U.S. Cl. ............... 355/67; 355/71; 396/483; 359/227
(58) Field of Search ............. 355/20, 67, 68, 355/71; 396/483, 6, 535, 355, 529, 531, 435; 359/227, 232, 233, 601, 613, 614, 894; 74/89.14

(56) References Cited

U.S. PATENT DOCUMENTS

| | | | | |
|---|---|---|---|---|
| 2,352,043 A | * | 6/1944 | Ardenne | 250/311 |
| 2,773,413 A | * | 12/1956 | Schade | 356/124 |
| 2,782,685 A | * | 2/1957 | Dimmick et al. | 359/894 |
| 2,998,730 A | * | 9/1961 | Raskhodoff et al. | 74/89.14 |
| 3,088,366 A | * | 5/1963 | Petrov et al. | 352/71 |
| 3,365,262 A | * | 1/1968 | Newcomer | 359/232 |
| 3,454,328 A | * | 7/1969 | Engel | 359/232 |
| 4,295,186 A | * | 10/1981 | Sugiura et al. | 362/217 |
| 4,488,803 A | | 12/1984 | Nishihama et al. | 355/28 |
| 4,601,572 A | | 7/1986 | Wise | 355/68 |
| 4,868,383 A | * | 9/1989 | Kurtz et al. | 250/228 |
| 4,926,202 A | * | 5/1990 | Fukuda et al. | 396/486 |
| 5,084,729 A | | 1/1992 | Yakubo et al. | 355/74 |
| 5,103,385 A | * | 4/1992 | Federico et al. | 362/298 |
| 5,335,158 A | * | 8/1994 | Kaplan et al. | 362/303 |
| 5,640,228 A | | 6/1997 | Keeney | 355/72 |
| 5,745,293 A | * | 4/1998 | Lassalle | 359/614 |

* cited by examiner

Primary Examiner—Russell Adams
Assistant Examiner—Rodney Fuller
(74) Attorney, Agent, or Firm—Barry R. Lipsitz

(57) ABSTRACT

An exposure slit for an image recording apparatus comprises a plate having an opening for the passage of light. First and second inclined walls extend toward each other from the plate to form a slit over the opening. The inclined walls form a light trap which reduces the occurrence of fogging in the image recorder.

26 Claims, 2 Drawing Sheets

EXPOSURE SLIT WITH LIGHT REFLECTION HOOD

BACKGROUND OF THE INVENTION

The present invention relates to apparatus for imaging photographic film or the like, and more particularly, to an exposure slit having a light reflection hood to reduce film fogging. As used herein, the term "film" is intended to mean any type of image recording media that is responsive to light, including photographic film, dye transfer media and the like, and is not to be construed only as photographic film.

In order to record high quality images on photographic film or other media for the production of movies or slides, film recorders are used. In a conventional film recorder, a light beam from a cathode ray tube ("CRT"), laser apparatus, or the like is controlled by a deflection system to scan across a stationary frame of photographic film to expose the film with an image. Typically, the images are generated by a computer for the production of slides, transparencies, photographs or the like. Alternatively, the images can comprise natural images acquired by a scanner or television camera for subsequent processing by a computer.

Known film recorders, such as those sold under the trademark SOLITAIRE® by Management Graphics, Inc. of Minneapolis, Minn., U.S.A., typically include a light source such as a CRT for producing a beam, a deflection system for scanning the beam across the face of the CRT, a system control and central processor unit ("CPU") for controlling the deflection system, and a camera (i.e., "film transport"). The later component may include a film transport body, lens, lens mounting assembly, aperture plate, film plate and film transport mechanism.

On a SOLITARE® film recorder, an image to be recorded is first written on the phosphor of the CRT by deflecting an electron beam in a raster pattern and modulating the intensity of the beam. This process is analogous to the creation of a television picture. Alternatively, the image can be written on the CRT using well-known time modulation techniques, wherein the beam intensity is constant but the time the beam is kept at each point is varied depending on the exposure required.

The resulting pattern ("the object image") on the CRT is optically imaged onto photographic film or the like by the film transport, which contains the required optics and mechanism to advance the film to successive frames. Other types of light sources can be substituted for the CRT in a film recorder. Examples include fiber optic sources, lasers and focused light impinging a rotating drum wherein one or more rotations are completed for each scanned line.

One problem that has arisen when light is scanned onto the film one line at a time is that the light for one line will bleed over into other lines. This results in fogging of the image or a halo effect that is detrimental to the final image.

As technology has improved, film recorders have been steadily getting faster in order to reduce imaging time. A requirement of this faster performance is that the cathode ray tube (or other light source) used in the film recorder must produce more light. As a result of having more light, the unwanted portion of light that bounces around inside of the film recorder due to the light source, filters, lenses, the camera box and film surface becomes more significant. This increases the problem of fogging referred to above.

The use of an exposure slit to reduce fogging in an image recording apparatus is known. For example, U.S. Pat. No. 5,640,228 discloses an exposure slit for a shuttle style film gate in a film transport. The exposure slit is provided on a plate that is mounted to the film gate shuttle. After the shuttle advances a frame of the film, it carries the slit with it during its return to a home position. Exposure of the film frame is made through the slit during the return travel.

Current generations of film recorders using such a slit can still suffer from fogging due to the increased light used to reduce imaging time. Thus, it would be advantageous to provide an improved exposure slit to reduce undesirable light from fogging the image on the film. It would be advantageous for such a slit to also create higher contrast and dynamic range. Such improvements will result in more vivid colors and clarity in the final image.

The present invention provides an improved exposure slit having the aforementioned and other advantages.

SUMMARY OF THE INVENTION

In accordance with the present invention, an exposure slit is provided for an image recording apparatus. The exposure slit includes a plate having an opening for the passage of light. First and second inclined walls extend toward each other from the plate to form a slit over the opening. The slit formed by the inclined walls is narrower than the opening, and the walls function as a light reflection hood.

The inclined walls can be formed either from a portion of the plate material itself, e.g. by punching and/or bending the plate material, or can be separate pieces attached to the plate. In a preferred embodiment, the inclined walls are sharply pointed at edges forming the slit.

The inclined walls may have opposing flat surfaces that face each other to form the slit, with the flat surfaces being perpendicular to the plate. Alternatively, the inclined walls may have opposing undercut surfaces that face each other to form the slit. In such an embodiment, the undercut surfaces are generally perpendicular to the plate.

An image recording apparatus is also provided for exposing a recording medium with radiation from an imaging source. The image recording apparatus comprises a plate having an elongated opening arranged in proximity to the recording medium. First and second inclined walls extend toward each other from the plate to form a slit over the opening for passing radiation to the recording medium. The slit is narrower than the opening. Transport means can be provided to drive the plate along the recording medium, thereby allowing exposure of different regions of the recording medium via the slit.

A plate is provided having an opening for the passage of light therethrough for use in conjunction with the recording medium in an image recording apparatus. First and second inclined walls extend toward each other from the plate to form a slit over the opening. This slit is narrower than the opening in the plate. The plate is mounted for movement along at least a portion of the recording medium, with the exposure slit being adjacent to the portion of the recording medium. Radiation is passed to the recording medium portion via the slit during an image scanning operation.

DETAILED DESCRIPTION OF THE INVENTION

Figure 1:
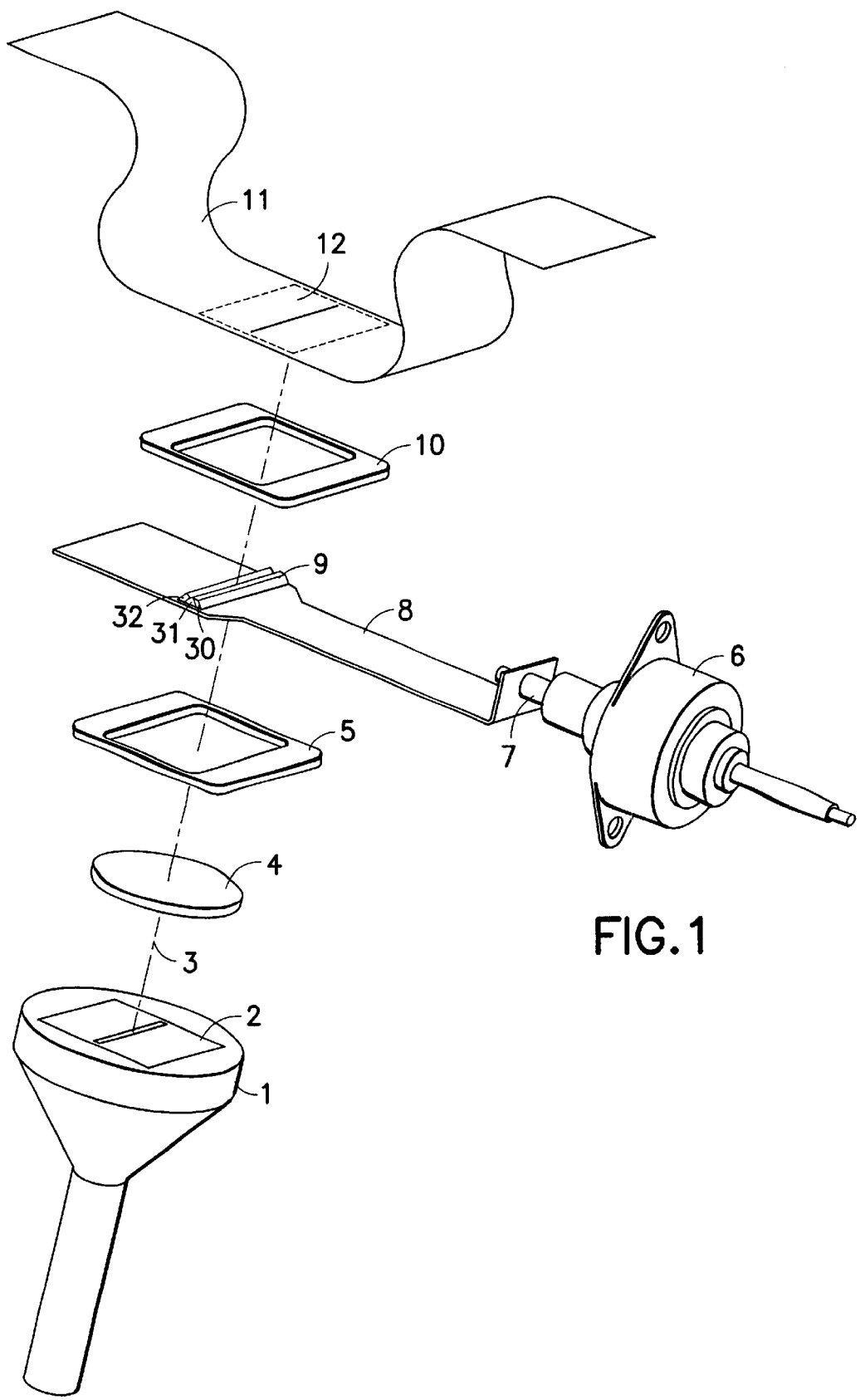
FIG. 1 is a schematic illustration of an image recording apparatus using the exposure slit of the present invention.

The optical path in a typical film recorder consists of the various basic components illustrated in FIG. 1. In particular, a light source such as a cathode ray tube (CRT) 1 is used to generate an image 2, shown on the face of the CRT. A lens 4 is used to focus the image 2 from the light source on photographic film 11 or the like. As illustrated in FIG. 1, the image recorder optics reproduce the image 2 on the film as illustrated at 12. It should be understood that the reproduced image 12 is formed on the film 11 using a scanning technique, one line at a time, as well known in the art.

Bottom aperture plate 5 and top aperture plate 10 are provided between the lens 4 and the film 11 in order to frame the image on the film.

In accordance with the present invention, a moving slit 9 is provided on a plate 8 to act as a light trap for unwanted light. The plate 8 is fabricated from a thin sheet of metal or similar hard material and has an opening 31 for the passage of light. A narrow tent-shaped slit 9 is created over the opening 31 by inclined walls 30, 32. The walls 30, 32 can be punched from the material of the slit plate 8 or can be separate elements attached to the slit plate by welding, soldering, or an appropriate adhesive. The opening 31 and slit 9 provide a path through which the desired light 3 reaches the film plane.

The slit is moved in synchronization with the image scan line from the CRT 1 via a precise motion device. For example, the slit motion device can comprise a worm drive stepper motor 6 linked to the slit plate via a shaft 7. Alternatively, the slit plate 8 can be attached directly to a shuttle style film gate, as disclosed in previously mentioned U.S. Pat. No. 5,640,228. Although moving slits have been in use in film recorders for some time, they do not meet the lower fog requirements when used with brighter CRTs or other intense light sources. The incorporation of a tent-shaped slit 9 overcomes the problems of the prior art. In particular, the tent-shaped slit formed from inclined walls 30, 32 of the plate 8 acts as a light baffle and also diverts unwanted light that reflects away from the film off the film plane.

Figure 2:
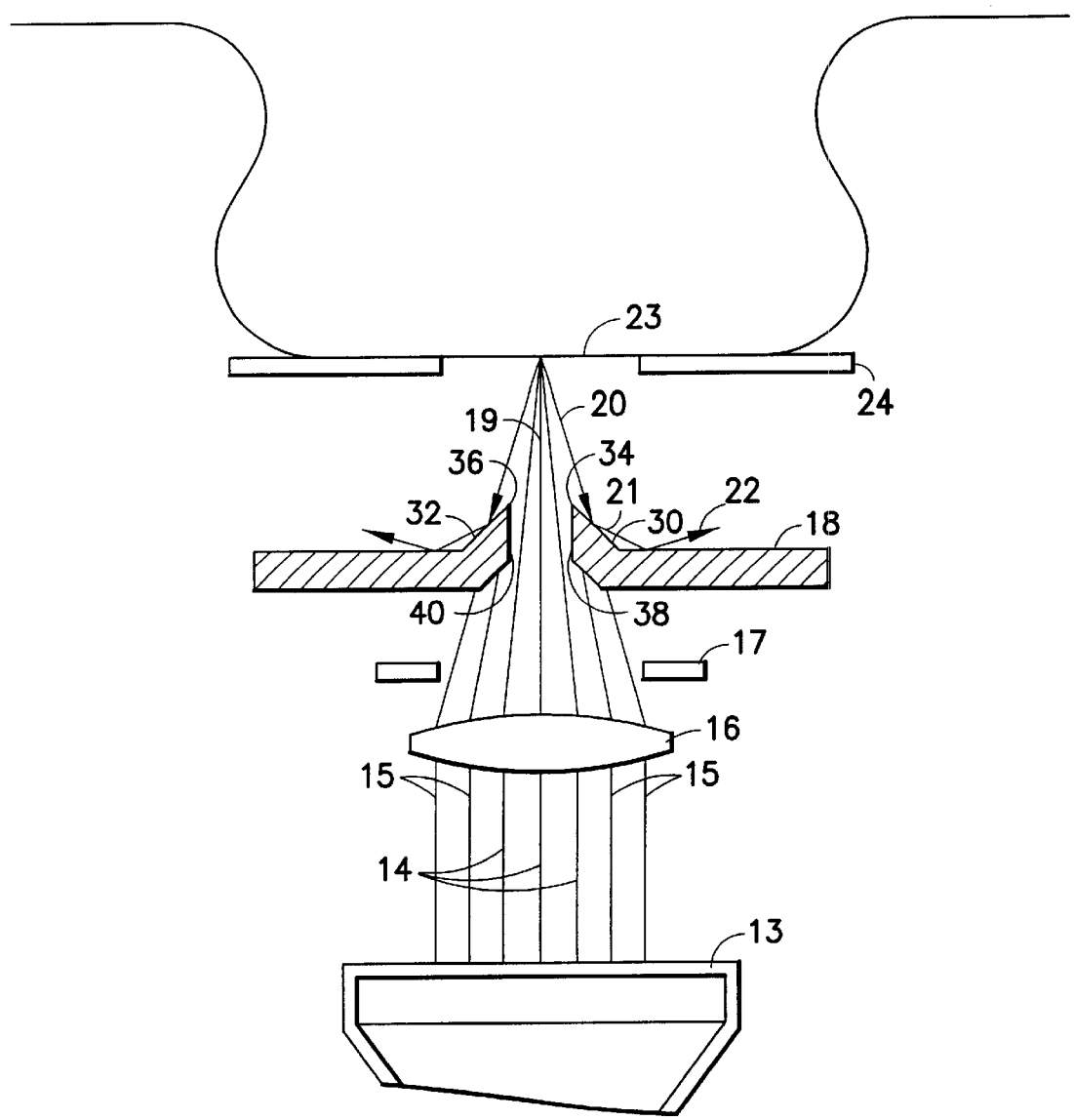
FIG. 2 is a cross-sectional view illustrating the use of the slit in connection with a film recorder.
Figure 3:
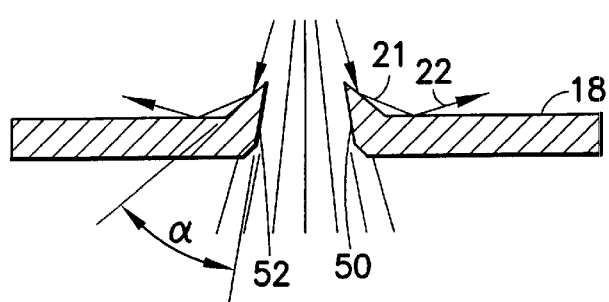
FIG. 3 is a cross-sectional view illustrating an alternate embodiment of the slit wherein the facing walls are undercut

The operation of the tent-shaped slit (i.e., "slight trap") is illustrated in FIG. 2. In a typical imaging cycle, light from the CRT 13 (or other light producing device) enters a lens 16. This light consists of both the desirable image content (rays 14) and the undesirable light (rays 15). The bottom face of plate 18 blocks a large portion of the unwanted light, allowing the image content to pass through. Once the light 19 from the image strikes the highly reflective surface of the film 23, as much as 50% of the light is reflected back toward the plate 18. The light reflected back is referred to in FIG. 2 by reference numeral 20. This portion of the light then strikes the inclined walls 30, 32 of the slit, which are coated with a black (or other light absorbing) material. In practice, the black coating does not absorb all the light, and a significant portion could still bounce back up to the film plane. To reduce the fog effect of this light, the inclined wall 30, 32 of the slit are inclined at an angle a with respect to vertical, as shown in FIG. 3. The angle a is typically about 45°. The inclined walls, 30, 32 direct the reflected light away from the film plane as illustrated by rays 21, 22 so that the light is further absorbed by other black objects in the camera. An aperture 17 between the lens 16 and slit plate 18 further restricts stray light from the lens from propagating toward the film plane.

It is advantageous to position the slit plate 18 as close to the film plane as possible. The film plane is defined as the surface of film 23 that is imaged, i.e., the surface of film 23 shown resting on aperture 24 in FIG. 2. By positioning the slit plate as close to the film plane as possible, the slit width can be minimized, thereby trapping more of the unwanted light from below.

The tips 34, 36 of the slit wall closest to the film plane are formed to a sharp point to reduce the area that could reflect light back at the film. In addition, the inside walls 38, 40 of the slit are designed to be vertical as illustrated in FIG. 2 to minimize any reflections back to the film plane. In an alternate embodiment illustrated in FIG. 3, the inside walls 50, 52 of the slit are slightly undercut. Such structure also minimizes reflections back to the film plane.

Dimensions of the various components of the slit will depend upon the geometry of the imaging optics. Typically, however, the angle α will be about 45°, the width of the slit will range from about 0.03 to 0.12 inches, and the distance from the slit to the film plane will be less than 0.05 inches, although this can vary based on the particular implementation.

It should now be appreciated that the present invention provides a unique exposure slit having inclined walls that provide a light trap in order to reduce the occurrence of fogging in an image recorder or the like. Although the invention has been described in connection with a preferred embodiment thereof, various adaptations and modifications may be made thereto without departing from the scope of the invention as set forth in the claims.

What is claimed:

1. An exposure slit for use with a light sensitive image recording medium, the exposure slit comprising:
    a plate having an opening in a planar surface thereof; and
    first and second inclined walls extending toward each other and away from the planar surface of said plate and toward said recording medium to form a slit over said opening, said first and second inclined walls adapted to divert light reflected from the image recording medium away from the image recording medium to reduce fogging of the image recording medium during exposure thereof.

2. An exposure slit in accordance with claim 1 wherein said inclined walls are formed from a portion of the plate material.

3. An exposure slit in accordance with claim 1 wherein said inclined walls are separate pieces attached to said plate.

4. An exposure slit in accordance with claim 1 wherein said inclined walls are sharply pointed at edges forming said slit.

5. An exposure slit in accordance with claim 4 wherein:
    said inclined walls have inside walls with opposing flat surfaces that face each other to form said slit; and
    said opposing flat surfaces are perpendicular to said plate.

6. An exposure slit in accordance with claim 4, wherein:
    said inclined walls have inside walls with opposing undercut surfaces that face each other to form said slit; and
    said undercut surfaces are substantially perpendicular to said plate.

7. An exposure slit in accordance with claim 1 wherein:
    said inclined walls have inside walls with opposing flat surfaces that face each other to form said slit; and
    said opposing flat surfaces are perpendicular to said plate.

8. An exposure slit in accordance with claim 1, wherein:
    said inclined walls have inside walls with opposing undercut surfaces that face each other to form said slit; and
    said undercut surfaces are substantially perpendicular to said plate.

9. An exposure slit in accordance with claim 1 wherein said walls are inclined at an angle of about 45° with respect to said plate.

10. An exposure slit in accordance with claim 1 wherein said slit is narrower than the opening in said plate.

11. An image recording apparatus for exposing a light sensitive recording medium with radiation from an imaging source, the apparatus comprising:

a plate having an elongated opening in a planar surface thereof arranged in proximity to said recording medium; and first and second inclined walls extending toward each other and away from the planar surface of said plate toward said recording medium to form a slit over said opening, said first and second inclined walls adapted to divert radiation reflected from the recording medium away from the recording medium.

12. Apparatus in accordance with claim 11 further comprising:

transport means for driving said plate along said recording medium to allow exposure of different regions of the recording medium via said slit.

13. Apparatus in accordance with claim 11 wherein said inclined walls are formed from a portion of the plate material.

14. Apparatus in accordance with claim 11 wherein said inclined walls are separate pieces attached to said plate.

15. Apparatus in accordance with claim 11 wherein said inclined walls are sharply pointed at edges thereof forming said slit and facing said recording medium.

16. An exposure slit in accordance with claim 15 wherein:

said inclined walls have inside walls with opposing flat surfaces that face each other to form said slit; and said opposing flat surfaces are perpendicular to said plate.

17. An exposure slit in accordance with claim 15, wherein:

said inclined walls have inside walls with opposing undercut surfaces that face each other to form said slit; and said undercut surfaces are substantially perpendicular to said plate.

18. An exposure slit in accordance with claim 11 wherein:

said inclined walls have inside walls with opposing flat surfaces that face each other to form said slit; and said opposing flat surfaces are perpendicular to said plate.

19. An exposure slit in accordance with claim 11, wherein:

said inclined walls have inside walls with opposing undercut surfaces that face each other to form said slit; and said undercut surfaces are substantially perpendicular to said plate.

20. Apparatus in accordance with claim 11 wherein said exposure slit is arranged adjacent to said recording medium.

21. Apparatus in accordance with claim 11 wherein said slit is narrower than the opening in said plate.

22. A plate having an opening in a planar surface thereof for use with a light sensitive image recording medium, said plate comprising:

first and second inclined walls extending toward each other and away from the planar surface of said plate to form a slit over said opening, said first and second inclined walls adapted to divert light reflected from the image recording medium away from the image recording medium to reduce fogging of the image recording medium during exposure thereof;

said plate being adapted for movement along a portion of said recording medium with said exposure slit adjacent to said portion and said inclined walls extending toward said portion.

23. A plate in accordance with claim 22 wherein said inclined walls are formed from a portion of the plate material.

24. A plate in accordance with claim 22 wherein said inclined walls are separate pieces attached to said plate.

25. A plate in accordance with claim 22 wherein said inclined walls are sharply pointed at edges forming said slit pointing toward said recording medium.

26. A plate in accordance with claim 22 wherein said slit is narrower than the opening in said plate.

* * * * *